(12) United States Patent
Bugenhagen

(10) Patent No.: US 7,623,454 B1
(45) Date of Patent: Nov. 24, 2009

(54) PACKET-ORIENTED CROSS-CONNECT SYSTEM

(75) Inventor: Michael K. Bugenhagen, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 775 days.

(21) Appl. No.: 11/280,044

(22) Filed: Nov. 16, 2005

(51) Int. Cl.
*H04L 12/50* (2006.01)

(52) U.S. Cl. .............. 370/231; 370/235; 370/241; 370/254; 370/375; 709/227; 709/249

(58) Field of Classification Search ............ None
See application file for complete search history.

(56) References Cited

U.S. PATENT DOCUMENTS

| | | | | |
|---|---|---|---|---|
| 5,197,062 A | * | 3/1993 | Picklesimer | 370/508 |
| 7,272,309 B1 | * | 9/2007 | Tamil et al. | 398/47 |
| 2002/0135835 A1 | * | 9/2002 | Lauder et al. | 359/124 |
| 2002/0181482 A1 | * | 12/2002 | Dally et al. | 370/412 |

* cited by examiner

*Primary Examiner*—Chi H. Pham
*Assistant Examiner*—Shick Hom

(57) ABSTRACT

A packet-oriented cross-connect system is provided. Included is a first channel interface configured to receive a first data packet stream and transfer the first data packet during a first set of time slots to a channel connection employing time-division multiplexing. A second channel interface is configured to receive the first data packet stream from the channel connection. A third channel interface is configured to receive a second data packet stream and transfer the second data packet stream during a second set of time slots over the channel connection. Also, a fourth channel interface is configured to receive the second data packet stream from the channel connection. A test device is also included which is coupled to the channel connection and configured to receive and analyze a portion of the first data packet stream and a portion of the second data packet stream.

27 Claims, 5 Drawing Sheets

PACKET-ORIENTED CROSS-CONNECT SYSTEM

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to communication systems employing network-to-network interfaces, and more particularly to a packet-oriented cross-connect system for communication systems.

2. Description of the Prior Art

A significant portion of today's long-distance communications, such as those involving voice, multimedia, and other forms of data traffic over the Internet, are carried from a source to a destination over at least one communication "backbone," or core network. FIG. 1 provides a simplified view of a portion of a communication network 1 employed by a first communication device 2 and a second communication device 4 for exchanging data therebetween. Each of the communication devices 2, 4 may be a personal computer, personal digital assistant (PDA), wireless phone, or any customer premise equipment (CPE) or other device capable of transmitting and receiving data.

In the particular example of FIG. 1, each of the communication devices 2, 4 is coupled to a separate access network 6, 8, respectively, by way of a user-to-network interface (UNI) 12, 14. The UNIs 12, 14 may be dial-up connections, digital subscriber line (DSL) connections, cable modem connections, or any other suitable wireline, wireless, or optical communication connection. Each of the access networks 6, 8, such as those provided by Bell South, Time Warner Cable, and others, provides end-to-end access between communication devices directly coupled to the access network 6, 8. In addition, each of the access networks 6, 8 provides communication access between a directly-coupled communication device and another remote communication device by way of a backbone or core network 10, such as SprintLink™, provided by Sprint Communications L.P. Each of the access networks 6, 8 is coupled to the core network 10 by way of a network-to-network interface (NNI) 16, 18, respectively. Since the communication devices 2, 4 of FIG. 1 are coupled to separate access networks 6, 8, data transferred between them passes through the core network 10.

Each access network 6, 8 typically provides communication access between the core network 10 and a large number of communication devices coupled directly with the access network 6, 8. Accordingly, the NNIs 16, 18 coupling the access networks 6, 8 with the core network 10 normally are high-capacity, high-bandwidth wireline or optical network connections, such as Ethernet, Packet Over SONET (POS), Asynchronous Transfer Mode (ATM), and the like. Given the extremely large amount of data usually being transferred over the NNIs 16, 18, the core network 10 typically combines, consolidates, and segregates traffic of varying formats from different access networks 6, 8 by way of a large interconnected collection of routers, switches, add-drop multiplexers (ADMs), and the like within the core network 10. This process is often called "grooming."

This grooming of various streams or channels of data traffic potentially causes concern in at least two cases. For one, some access network customers, such as financial institutions and governmental agencies, prefer more isolated and secure data connections than those normally available through a core network 10 where extensive combining and consolidation of data channels occurs. Also, in order to troubleshoot problems exhibited by a particular communication connection, to determine service level agreement (SLA) performance, or the like, a central point of connection between channels to monitor communications with one or more access networks 6, 8 is desirable. However, such connectivity is difficult to provide in the complex and distributed grooming environment within the network core 10.

SUMMARY OF THE INVENTION

One embodiment of the invention, described below, provides a packet-oriented cross-connect system. Included is a first channel interface configured to receive a first data packet stream and transfer the first data packet stream during a first set of time slots over a channel connection employing time-division multiplexing. A second channel interface is configured to receive the first data packet stream from the channel connection. Also provided is a third channel interface configured to receive a second data packet stream and transfer the second data packet stream during a second set of time slots over the channel connection. In addition, a fourth channel interface is configured to receive the second data packet stream from the channel connection. Also provided is a test device coupled to the channel connection and configured to receive and analyze a portion of the first data packet stream and a portion of the second data packet stream.

In another embodiment, a method for cross-connecting network connections is supplied. A first data packet stream is transferred during a first set of time slots over a channel connection employing time-division multiplexing. The first data packet stream is received over the channel connection during the first set of time slots. Similarly, a second data packet stream is transferred and received over the channel connection during a second set of time slots. A portion of the first data packet stream and a portion of the second data packet stream are analyzed by way of a test device coupled to the channel connection.

Additional embodiments and advantages of the present invention will be realized by those skilled in the art upon perusal of the following detailed description, taken in conjunction with the accompanying drawings.

DETAILED DESCRIPTION OF THE INVENTION

Figure 2:
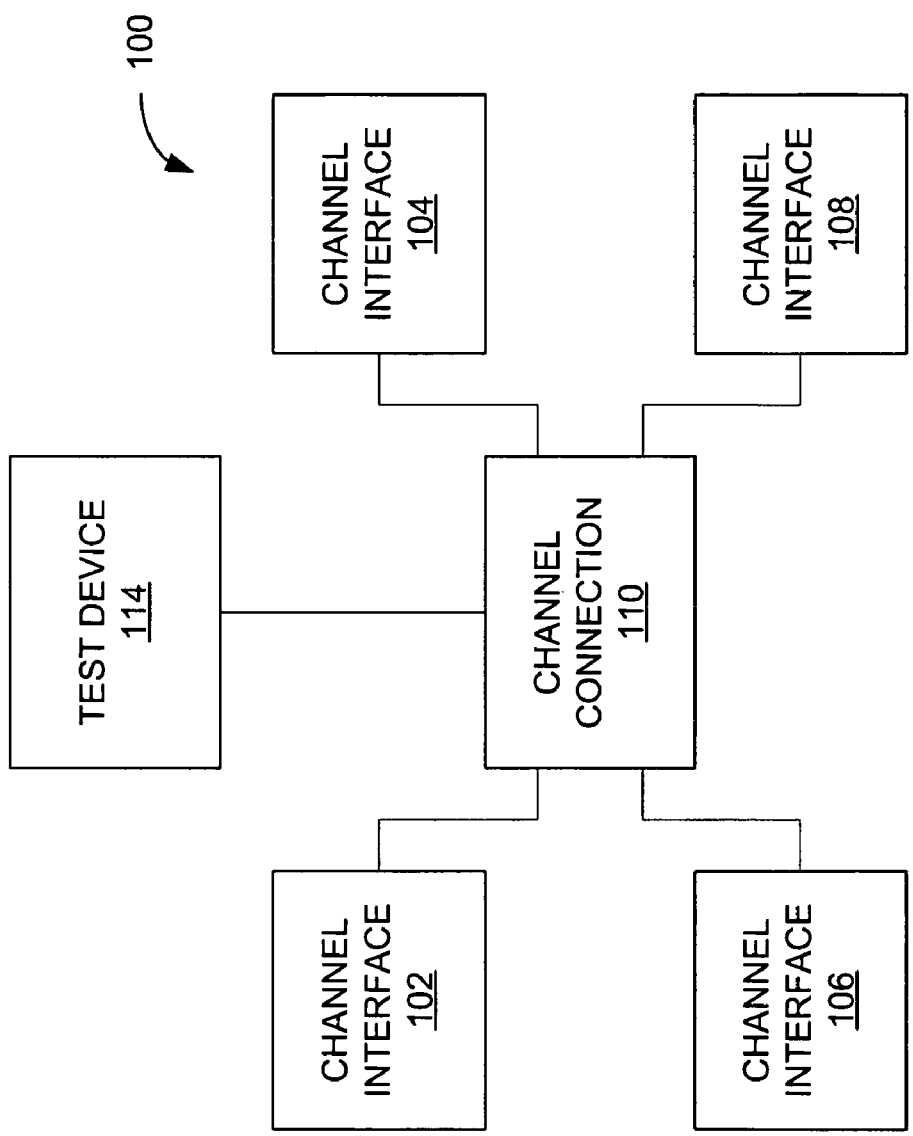
FIG. 2 is a block diagram of a packet-oriented cross-connect system according to an embodiment of the invention.

FIG. 2 depicts a packet-oriented cross-connect system 100 according to one embodiment of the invention. The system 100 includes a first channel interface 102, a second channel interface 104, a third channel interface 106, and a fourth channel interface 108, each of which is coupled with a channel connection 110. Also coupled with the channel connection 110 is a test device 114. The first channel interface 102 is configured to transfer a first data packet stream during a first set of time slots or intervals over the channel connection 110 by way of time-division multiplexing. The second channel interface 104 is configured to receive the first data packet stream from the channel connection 110 during the first set of time slots. Similarly, the third channel interface 106 is configured to transfer a second data packet stream over the channel connection 110 during a second set of time slots, while the fourth channel interface 108 receives the second data packet stream over the channel connection 110 during the second set of time slots. In one embodiment, the first set of time slots forms a first virtual channel through which the first channel interface 102 and the second channel interface 104 communicate. Similarly, communication between the third channel interface 106 and the fourth channel interface 108 occurs by way of a second virtual channel implemented via the second set of time slots. Thus, in this example, the first and second virtual channels are provided by way of a packet-over-TDM (time-division-multiplexed) implementation. The test device 114 analyzes a portion of the first data packet stream and a portion of the second data packet stream via the channel connection 110.

Figure 3:
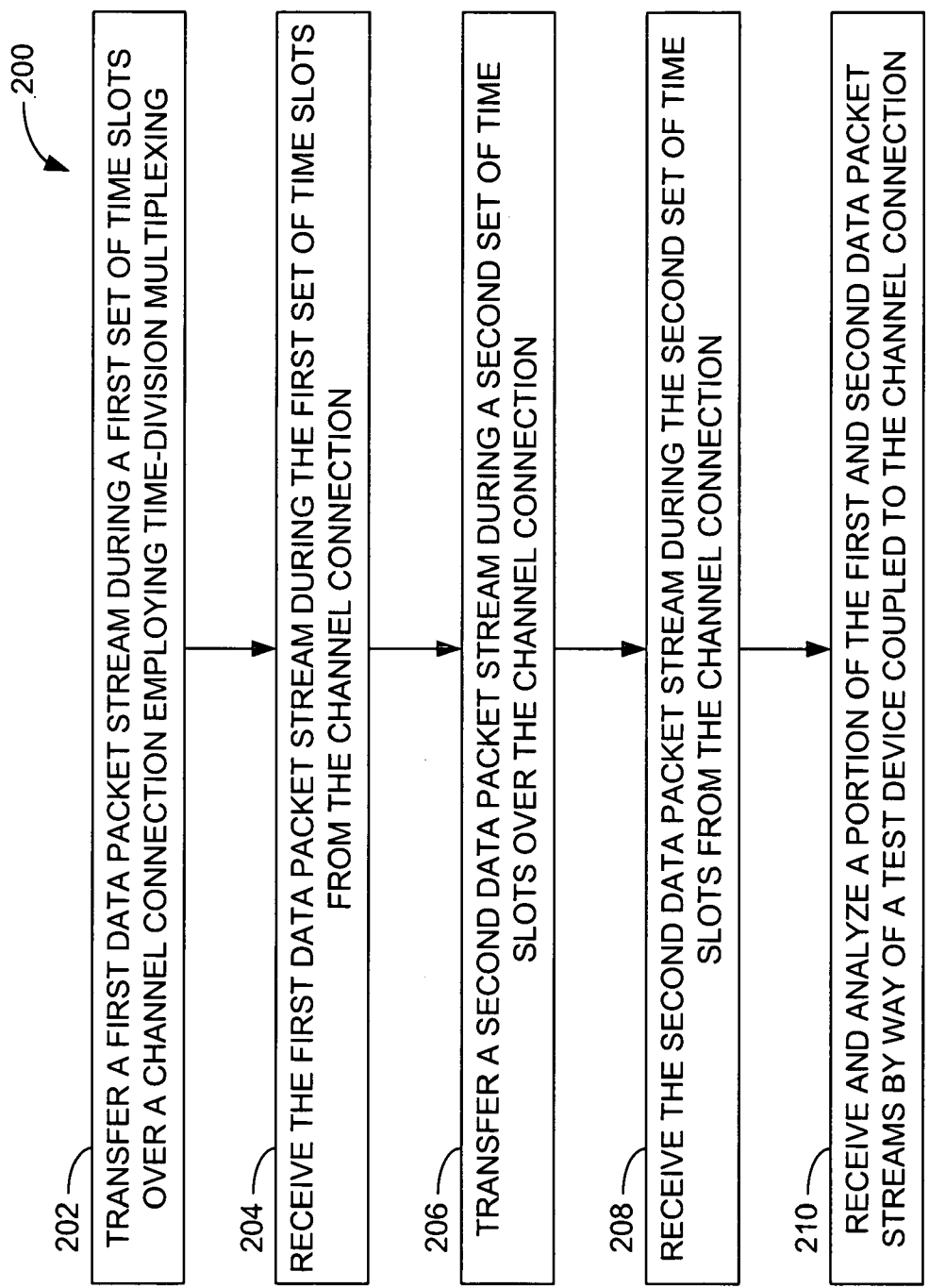
FIG. 3 is a flow diagram of a method for cross-connecting network connections according to an embodiment of the invention.

FIG. 3 provides a flow diagram of a method 200 according to an embodiment of the invention for cross-connecting network connections. A first data packet stream is transferred during a first set of time slots over a channel connection employing time-division multiplexing (operation 202). The first data packets stream is also received during the first set of time slots from the channel connection (operation 204). In addition, a second data packet stream is transferred during a second set of time slots over the channel connection (operation 206). The second data packet stream is received during the second set of time slots from the channel connection (operation 208). All or a portion of the first data packet stream and the second data packet stream are analyzed by way of a test device coupled to the channel connection (operation 210).

Figure 4:
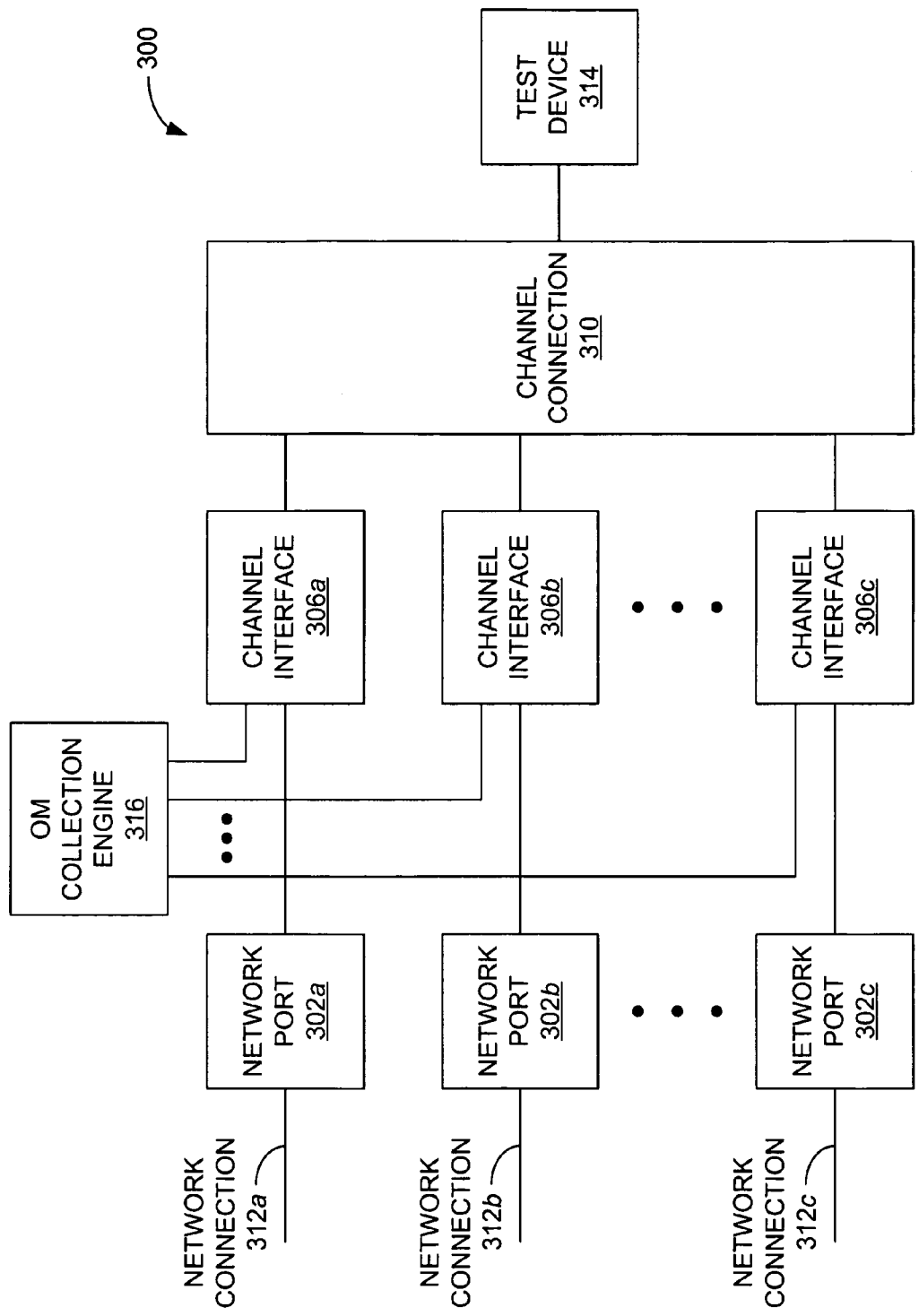
FIG. 4 is a block diagram of a packet-oriented cross-connect system according to another embodiment of the invention.

In another embodiment shown in FIG. 4, a system 300 for cross-connecting multiple network connections 312a-312c is provided. Each of the network connections 312a-312c is coupled with a network port 302a-302c, respectively. Further, each network port 302a-302c is coupled with an associated channel interface 306a-306c. Each of the channel interfaces 306a-306c are coupled with each other by way of a channel connection 310, which provides a TDM connection through which each of the channel interfaces 306a-306c may intercommunicate by way of virtual channels. While FIG. 4 specifically illustrates three network ports 302 and three channel interfaces 306, virtually any number of ports 302 and interfaces 306 may be coupled with the channel connection 310, depending on the data rates of the associated network connections 312 and the maximum data rate sustainable over the channel connection 310. Also connected to the channel connection 310 is a test device 314 capable of generating, transmitting and receiving communication data to and from the various channel interfaces 306. Optionally coupled with each of the channel interfaces 306 is an operations management (OM) collection engine 316, the operation of which is described in greater detail below.

Figure 5:
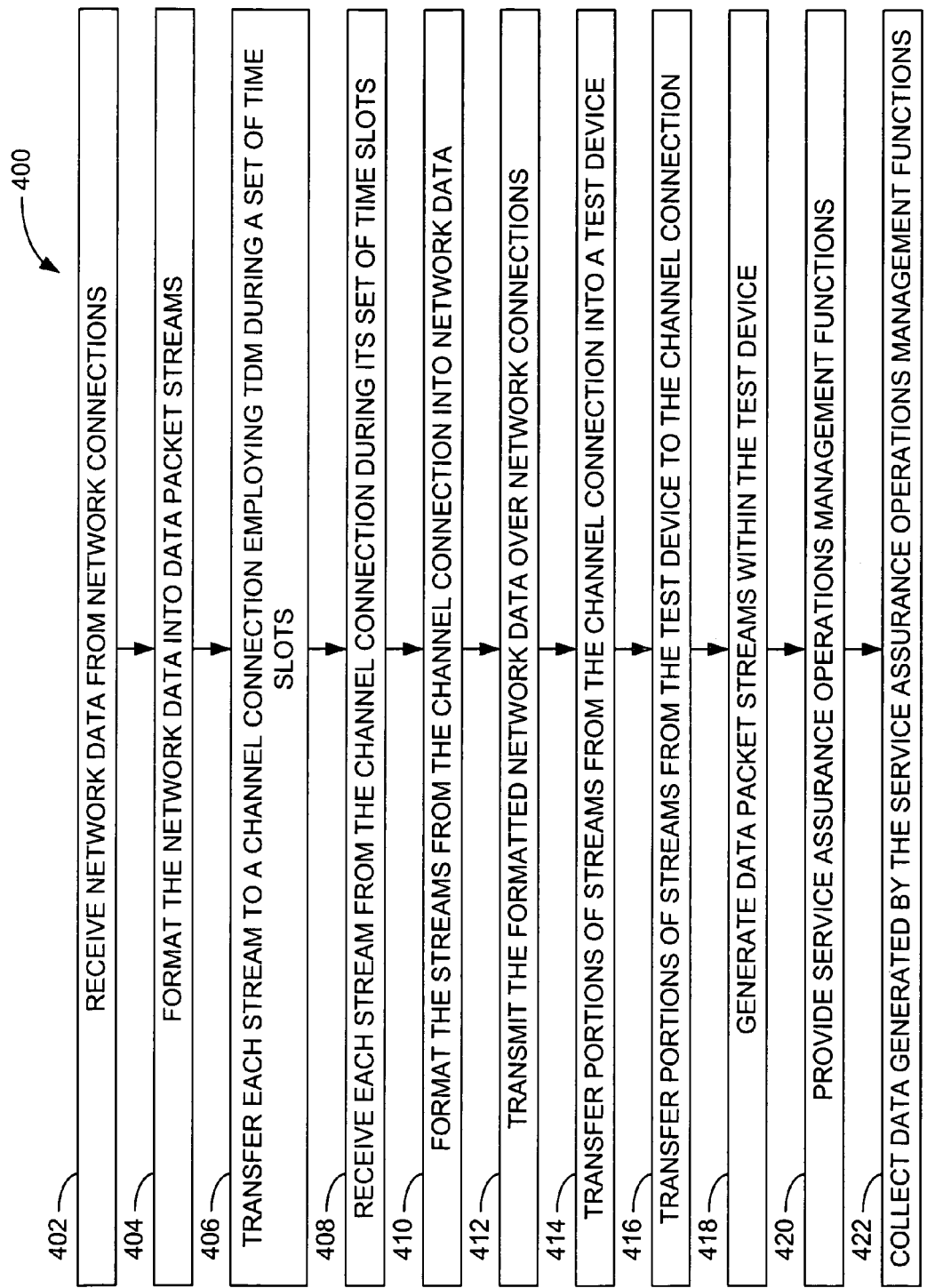
FIG. 5 is a flow diagram of a method for cross-connecting network connections according to another embodiment of the invention.

The operation of the system 300 of FIG. 4 is discussed below in conjunction with a method 400, illustrated in FIG. 5, for cross-connecting multiple network connections. While the method 400 is described with particular reference to the system 300, the method 400 is not limited in its applicability to the system 300, as other systems and structures may be capable of performing the operations of the method 400 described below.

Figure 1:
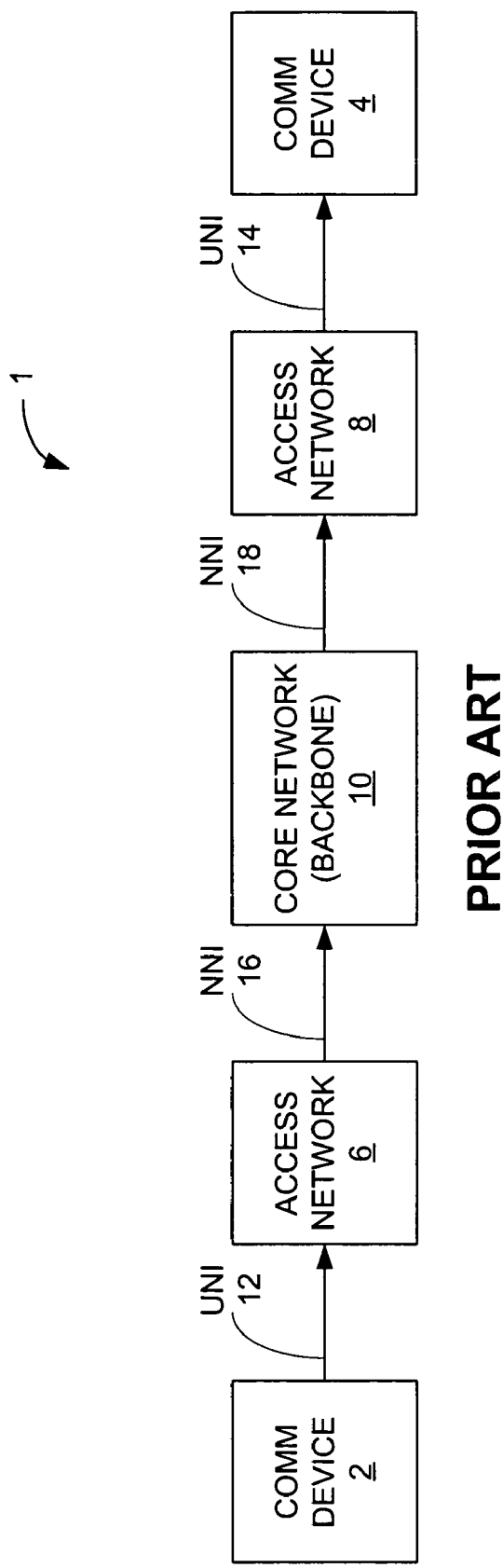
FIG. 1 is a simplified block diagram of a communication system from the prior art employing a backbone or core network.

In one embodiment, each of the network connections 312a-312c shown in FIG. 4 may be a connection to a different type of network available from an access network, such as a network-to-network interface (NNI) described in connection with FIG. 1. For example, a first network connection 312a may be an Ethernet connection, a second network connection 312b may be an ATM connection, and a third network connection 312c may be a POS connection. Thus, each network connection 312a-312c may employ a different data protocol Other possible network connections 312 may include, but are not limited to, a packet Optical Carrier-Level 3 (OC-3) connection, a Resilient Packet Ring (RPR) connection, a Frame Relay connection, and a Multi-Protocol Label Switching (MPLS) connection, or any other Layer 1 or Layer 2 connection. In one implementation, at least one of the network connections 312 may be transmitting and receiving data at a VT1.5 or STS-1 rate.

Each of the network ports 302 is configured to receive network data from its associated network connection 312 (operation 402) and format that data into a data packet stream (operation 404). This formatting may also include a protocol conversion, depending on the nature of network connection 302 to which it is coupled, in order to format the network data into data packets. In some embodiments, the protocol conversion may be implemented as encapsulation of the network data into the data packet stream. Due to this functionality provided by the network ports 302, the system 300 is capable of intercoupling several different network connections 312, each representing a vastly different data protocol. Also, each network port 302 also receives data packets from one or more channel interfaces 306, described in greater detail below. Each network port 302 reformats and converts these received data packets into network data (operation 410) for transmission over its associated network connection 312 (operation 412).

To facilitate acceptance of a variety of network connections 312 and associated protocols, the system 300 may be configured in one embodiment as a rack-based device allowing various types of network ports 302 to be inserted into the rack in any number or configuration to provide the desired connectivity with the plurality of network connections 312.

In one implementation, each data packet stream is an Ethernet data packet stream. As a result, the connections between the network ports 302, channel interfaces 306, the channel connection 310, the test device 314 and the OM collection engine 316 are compatible with Ethernet data packets. In other embodiments, other types of data packets capable of being utilized in a time-division-multiplexed (TDM) environment may be employed in the alternative.

As described above, each network port 302 is also coupled to a channel interface 306, which is configured to transfer data between its associated network port 302 and the channel connection 310 intercoupling each of the channel interfaces 306. In transferring data packets from its associated network port 302 to the channel connection 310, each channel interface 306 places packets of its associated data packet stream onto the channel connection 310 during a particular set of time slots as part of a TDM system (operation 406). In one embodiment, each available set of time slots is assigned to a particular virtual channel, or "tunnel," identifying a connection between two channel interfaces 306 via the channel connection 310. Further, each set of time slots identified with a channel typically occur one time slot at a time in a periodic or rotating fashion. Each channel interface 306 is also configured to receive data packets from the channel connection 310 during assigned sets of time slots for use by its associated network port 302 (operation 408).

As each set of time slots of the TDM system is identified with a particular virtual channel or tunnel, isolation of each channel from another is maintained, thus enhancing the security of each channel supported by the system 300. Also, due to the presence of these virtual channels, the system 300 need not employ any kind of address decoding scheme to determine to which channel interface 306 a particular data packet stream should be routed. As a result, the risk of sending data packets to an incorrect channel interface 306 based on an improper or forged address is minimized.

In one implementation, one or more sets of time slots may be assigned to each virtual channel or tunnel, depending on the relative bandwidth needs of each channel. Further, if the amount of traffic associated with a particular channel changes over time, the number of time slots associated with a channel may be adjusted upward or downward to accommodate these changes. Therefore, adaptations to changing data traffic volumes are made while maintaining the security provided by the TDM time slots.

More specifically, in one embodiment the channel interfaces 306 each utilize a General Framing Procedure (GFP), sometimes identified with next-generation Synchronous Optical Network/Synchronous Digital Hierarchy (SONET/SDH) communication systems. The use of GFP helps synchronize the data packets to be transferred over the channel connection 310 into appropriate time slots in a bandwidth-efficient manner. In related embodiments, the related technologies of Virtual Concatenation (VCAT) and Link Capacity Adjustment Scheme (LCAS) may be used in conjunction with GFP to increase usable bandwidth and dynamically change the use of the bandwidth of the channel connection 310.

The channel connection 310 provides a TDM link between each of the channel interfaces 306, as well as the test device 314. In one embodiment, using a TDM strategy compatible with Ethernet-level bandwidths, many network connections 312 may be served by a single system 300 with little latency or delay. For example, one cross-connect system 300 employing current Ethernet data rates may provide a bandwidth of approximately 3000 Synchronous Transport Signal (STS) equivalents, with less delay or latency (on the order of tens of microseconds) through the system 300 than normally experienced through a router (on the order of hundreds of milliseconds). Thus, the system 300 may provide carrier-class telecommunications with little latency. Further, due to the separation of each virtual channel provided by the time slots, mutual isolation of the channels is maintained, as mentioned above.

In one embodiment, a test device 314 is also coupled with the channel connection 310 so that it may receive portions of each data packet stream from (operation 414), as well transmit data packet streams to (operation 416), any of the channel interfaces 306 included in the cross-connect system 300 over the channel connection 310 while maintaining isolation between the virtual channels. More specifically, all data packets passing through the channel connection 310 may instead be routed first to the test device 314 during a particular set of time slots, and then thereafter route the packet stream from the test device 314 to the particular destination channel interface 306 over the channel connection 310 during that same set of time slots. In that case, the test device 314 may monitor the content of the data packets without modifying them or affecting their transfer rate through the system 300. The test device 314 may also monitor portions of data packet streams passing through the channel connection 310 without the packets actually being routed through the test device 314 by way of the test device 314 monitoring, or "snooping" the data passing across the channel connection 310. In another embodiment, the test device 314 may be configured to modify one or more of the data packets received from one of the channel interfaces 306 before forwarding the packet onto the intended receiving channel interface 306. In yet another example, the test device 314 may generate new data packets before transferring the packets over the channel connection 310 (operation 418).

As a result, the test device 314 may monitor any and all communication activity flowing through the channel connection 310 identified with one or more selected channels. Such testing may help in the troubleshooting and isolation of communication problems to a particular network connection 312. Also, the test device 314 may collect or generate operational performance data via the data packets of any virtual channel being supported by the channel connection 310. This data helps the test device 300 determine if communication performance being delivered by the various network connections 312 adheres to a particular SLA or agreed-upon quality of service (QoS).

In one implementation, one or more of the channel interfaces 306 may also be configured to provide service assurance operations management (OM) capability relating to the data packets passing through the channel connection 310 (operation 420). For example, OM functions such as providing "heart beats," measuring jitter, and other Ethernet Management Information Base (MIB) and probe functions may be provided by each of the channel interfaces 306.

In conjunction with this OM capability, an OM collection engine 316 may be coupled with each of the channel interfaces 306 to collect data generated by OM functions provided by each of the channel interfaces 306 (operation 422). This information would in turn be provided by the OM collection engine 316 to other portions of a network to which the system 300 is coupled, typically for purposes of network management by a network administrator. In one embodiment, the OM collection engine 316 performs correlation and performance threshold crossing for operational performance metric reporting. For network connections 312 associated with differing data protocols that are connected via virtual channel by the system 300, the OM collection engine 312 may also perform alarm correlation and pass-through depending on whether the cross-connection being implemented is configured to terminate protocol signals, or is configured to appear "transparent."

Based on the foregoing, various embodiments of the present invention provide a means for cross-connecting a number of network connections while maintaining isolation between each of the virtual channels intercoupling the network connections. Also, the structure of the systems disclosed herein allows the connection of a test device to any of the isolated virtual channels at a single site for purposes of troubleshooting and performance measurement. In particular, performance measurements of the various data packet streams by a test device comprising part of the system may occur periodically according to a schedule previously agreed-upon with a customer. Given the isolation between data packet streams, such measurements may take place primarily at the packet level, as opposed to the TDM level, possibly making the measurements more useful and pertinent to the customer. The information resulting from these measurements may then be provided to the customer as proof whether various aspects of an SLA with the customer are being provided.

Since each of the network connections coupled with a cross-connect system 300 may implement disparate data protocols, as described above, the system 300 may be employed outside of a core network, or in conjunction with a core network, between two or more different access networks to facilitate more secure, isolated data communications therebetween. Such communication may also occur without the aid of typical core network equipment, such as routers, which typically increase data transfer latency. Also, by providing a number of network connections, various implementations of the present invention impart high survivability upon the networks with which it is connected by allowing multiple routing paths through the networks via use of the multiple network connections. In addition, support for a variety of data protocols may ease the migration from one networking system and protocol to another by allowing upgraded portions of a network to communicate with older systems in a secure manner without employing a typical core network.

While several embodiments of the invention have been discussed herein, other embodiments encompassed within the scope of the invention are possible. For example, while several different networking connections and protocols such as Ethernet, MPLS, ATM, Frame Relay, and POS are discussed in relation to the network connections supported by examples of the invention, other protocols amenable to conversion to a packet-based, time-division-multiplexed system may be supported in other embodiments. In addition, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. A packet-oriented cross-connect system, comprising:
a first network port configured to receive first network data from a first network connection that employs a first data protocol, format the first network data into a first data packet stream, and transfer the first data packet stream to a first channel interface;
the first channel interface configured to receive the first data packet stream and transfer the first data packet stream during a first set of time slots over a channel connection employing time-division multiplexing;
a second channel interface configured to receive the first data packet stream from the channel connection;
a second network port configured to receive the first data packet stream from the second channel interface, format the first data packet stream into second network data, and transfer the second network data to a second network connection that employs a second data protocol;
a third network port configured to receive third network data from a third network connection, format the third network data into a second data packet stream, and transfer the second data packet stream to a third channel interface;
the third channel interface configured to receive the second data packet stream and transfer the second data packet stream during a second set of time slots over the channel connection;
a fourth channel interface configured to receive the second data packet stream from the channel connection;
a fourth network port configured to receive the second data packet stream from the fourth channel interface, format the second data packet stream into fourth network data, and transfer the fourth network data to a fourth network connection; and
a test device coupled to the channel connection and configured to receive and analyze a portion of the first data packet stream and a portion of the second data packet stream.

2. The system of claim 1, wherein the first data protocol consists of Ethernet, Asynchronous Transfer Mode, Packet Over Synchronous Optical Network, Frame Relay, Time Division Multiplexed, Multi-Protocol Label Switching, or Resilient Packet Ring.

3. The system of claim 1, wherein the second data protocol consists of Ethernet, Asynchronous Transfer Mode, Packet Over Synchronous Optical Network, Frame Relay, Time Division Multiplexed, Multi-Protocol Label Switching, or Resilient Packet Ring.

4. The system of claim 1, wherein the test device is further configured to receive a second portion of the first data packet stream, and forward the second portion of the first data packet stream during the first set of time slots to the second channel interface.

5. The system of claim 4, wherein the test device is further configured to modify at least one packet of the second portion of the first data packet stream before forwarding the second portion of the first data packet stream.

6. The system of claim 1, wherein the test device is further configured to generate a third data packet stream and to transfer the third data packet stream over the channel connection during the first time slot to the second channel interface.

7. The system of claim 1, wherein the first data packet stream and the second data packet stream each comprise an Ethernet data packet stream.

8. The system of claim 1, wherein the first channel interface and the second channel interface employ a number of time slots of the channel connection for the first data packet stream based on an amount of traffic of the first data packet stream.

9. The system of claim 1, wherein the first channel interface is further configured to format the first data packet stream by way of a Generic Framing Procedure.

10. The system of claim 9, wherein the first channel interface is further configured to employ Virtual Concatenation and a Link Capacity Adjustment Scheme to the first data packet stream.

11. The system of claim 1, wherein each of the first channel interface, the second channel interface, the third channel interface and the fourth channel interface is further configured to provide service assurance operations management functions.

12. The system of claim 11, further comprising an operations management collection engine configured to communicate with the service assurance operations management functions of the first channel interface, the second channel interface, the third channel interface, and the fourth channel interface.

13. A method of cross-connecting network connections, comprising:
receiving first network data from a first network connection that employs a first data protocol;

formatting the first network data into a first data packet stream;

transferring the first data packet stream during a first set of time slots over a channel connection employing time-division multiplexing;

receiving the first data packet stream during the first set of time slots from the channel connection;

formatting the first data packet stream into second network data after receiving the first data packet stream from the channel connection;

transferring the second network data to a second network connection that employs a second data protocol;

receiving third network data from a third network connection;

formatting the third network data into a second data packet stream;

transferring the second data packet stream during a second set of time slots over the channel connection;

receiving the second data packet stream from the channel connection;

formatting the second data packet stream into fourth network data after receiving the second data packet stream from the channel connection; and transferring the fourth network data to a fourth network connection analyzing a portion of the first data packet stream and a portion of the second data packet stream by way of a test device coupled to the channel connection.

14. The method of claim 3, wherein the first data protocol consists of Ethernet, Asynchronous Transfer Mode, Packet Over Synchronous Optical Network, Frame Relay, Time Division Multiplexed, Multi-Protocol Label Switching, or Resilient Packet Ring.

15. The method of claim 3, wherein the second data protocol consists of Ethernet, Asynchronous Transfer Mode, Packet Over Synchronous Optical Network, Frame Relay, Time Division Multiplexed, Multi-Protocol Label Switching, or Resilient Packet Ring.

16. The method of claim 13, further comprising:
receiving a second portion of the first data packet stream into the test device; and
forwarding the second portion of the first data packet stream during the first set of time slots to the second channel interface.

17. The method of claim 16, further comprising:
modifying at least one packet of the second portion of the first data packet stream in the test device before forwarding the second portion of the first data packet stream.

18. The method of claim 13, further comprising:
generating a third data packet stream in the test device; and
transferring the third data packet stream over the channel connection during the first set of time slots to the second channel interface.

19. The method of claim 13, wherein the first data packet stream comprises an Ethernet data packet.

20. The method of claim 13, further comprising employing a number of time slots of the channel connection for the first data packet stream based on an amount of traffic of the first data packet stream.

21. The method of claim 13, wherein transferring the first data packet stream is accomplished via a Generic Framing Procedure.

22. The method of claim 21, wherein transferring the first data packet stream further comprises employing Virtual Concatenation and a Link Capacity Adjustment Scheme to the first data packet stream.

23. The method of claim 13, further comprising providing service assurance operations management functions for the channel connection.

24. The method of claim 23, further comprising collecting operations management data generated by the service assurance operations management functions.

25. A system for cross-connecting network connections, comprising:
means for transferring a first data packet stream during a first set of time slots over a channel connection employing time-division multiplexing;
means for receiving the first data packet stream during the first set of time slots from the channel connection;
means for transferring a second data packet stream during a second set of time slots over the channel connection;
means for receiving the second data packet stream from the channel connection;
means for analyzing a portion of the first data packet stream and a portion of the second data packet stream via the channel connection;
means for receiving a second portion of the first data packet stream into the analyzing means;
means for forwarding the second portion of the first data packet stream during the first set of time slots to the second channel interface;
means for receiving first network data from a first network connection;
means for formatting the first network data into the first data packet stream;
means for formatting the first data packet stream into second network data after receiving the first data packet stream from the channel connection;
means for transferring the second network data to a second network connection;
means for receiving third network data from a third network connection;
means for formatting the third network data into the second data packet stream;
means for formatting the second data packet stream into fourth network data after receiving the second data packet stream from the channel connection; and
means for transferring the fourth network data to a fourth network connection.

26. The system of claim 25, further comprising:
means for modifying at least one packet of the second portion of the first data packets stream before forwarding the second portion of the first data packet stream.

27. The system of claim 25, further comprising:
means for generating a third data packet stream within the analyzing means; and means for transferring the third data packet stream over the channel connection during the first set of time slots to the second channel interface.

* * * * *

UNITED STATES PATENT AND TRADEMARK OFFICE
CERTIFICATE OF CORRECTION

PATENT NO.       : 7,623,454 B1
APPLICATION NO.  : 11/280044
DATED            : November 24, 2009
INVENTOR(S)      : Michael K. Bugenhagen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twenty-sixth Day of October, 2010

David J. Kappos
*Director of the United States Patent and Trademark Office*